United States Patent
Fan et al.

(10) Patent No.: US 10,117,283 B2
(45) Date of Patent: Oct. 30, 2018

(54) METHOD AND APPARATUS FOR D2D BASED ACCESS

(71) Applicant: Telefonaktiebolaget LM Ericsson (publ), Stockholm (SE)

(72) Inventors: Rui Fan, Beijing (CN); Qianxi Lu, Beijing (CN); Qingyu Miao, Beijing (CN); Stefan Wänstedt, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 109 days.

(21) Appl. No.: 15/110,988

(22) PCT Filed: Jan. 19, 2015

(86) PCT No.: PCT/CN2015/071043
§ 371 (c)(1),
(2) Date: Jul. 12, 2016

(87) PCT Pub. No.: WO2015/109983
PCT Pub. Date: Jul. 30, 2015

(65) Prior Publication Data
US 2016/0345357 A1   Nov. 24, 2016

(30) Foreign Application Priority Data
Jan. 27, 2014  (WO) ............... PCT/CN2014/071545

(51) Int. Cl.
*H04W 76/14* (2018.01)
*H04W 76/23* (2018.01)
(Continued)

(52) U.S. Cl.
CPC ....... *H04W 76/14* (2018.02); *H04W 28/0284* (2013.01); *H04W 28/08* (2013.01);
(Continued)

(58) Field of Classification Search
CPC ......... H04W 28/0242; H04W 28/0284; H04W 28/08; H04W 72/0486; H04W 72/1252
See application file for complete search history.

(56) References Cited

U.S. PATENT DOCUMENTS

2013/0045706 A1   2/2013  Hsu
2014/0094183 A1*  4/2014  Gao .................... H04W 72/048
                                                      455/450
(Continued)

FOREIGN PATENT DOCUMENTS

| CN | 102939788 A   | 2/2013  |
| CN | 103517343 A   | 1/2014  |
| WO | 2012159270 A1 | 11/2012 |

OTHER PUBLICATIONS

Extended European Search Report for European Patent Application No. 15740072.2, dated Aug. 28, 2017, 7 pages.
(Continued)

Primary Examiner — Ashley Shivers
(74) Attorney, Agent, or Firm — Withrow & Terranova, PLLC

(57) ABSTRACT

A method in a base station of a cellular radio system and a base station using the same are provided. The method comprises: obtaining at least one access control parameter for a device-to-device, D2D, based access; and transmitting a message including said at least one access control parameter to one or more terminal devices. Also provided are a method in a terminal device of a cellular radio system and a terminal device using the same. The method comprises: receiving a message from a base station of the cellular radio system, wherein said message includes at least one access control parameter for a device-to-device, D2D, based access; determining whether the D2D based access is allowed or barred based on the at least one access control
(Continued)

parameter; and initiating a D2D based access in response to determining that the D2D based access is allowed.

19 Claims, 6 Drawing Sheets

(51) Int. Cl.
  *H04W 74/04* (2009.01)
  *H04W 74/08* (2009.01)
  *H04W 28/12* (2009.01)
  *H04W 28/02* (2009.01)
  *H04W 28/08* (2009.01)
  *H04W 72/12* (2009.01)
  *H04W 74/00* (2009.01)
  *H04W 72/04* (2009.01)
  *H04W 28/06* (2009.01)
  *H04W 28/18* (2009.01)
  *H04W 92/18* (2009.01)
  *H04W 84/04* (2009.01)

(52) U.S. Cl.
  CPC ... *H04W 72/0486* (2013.01); *H04W 72/1252* (2013.01); *H04W 74/006* (2013.01); *H04W 74/04* (2013.01); *H04W 74/08* (2013.01); *H04W 76/23* (2018.02); *H04W 28/06* (2013.01); *H04W 28/18* (2013.01); *H04W 84/042* (2013.01); *H04W 92/18* (2013.01)

(56) References Cited

U.S. PATENT DOCUMENTS

| | | | | |
|---|---|---|---|---|
| 2014/0219095 | A1* | 8/2014 | Lim | H04W 72/085 370/235 |
| 2014/0307611 | A1* | 10/2014 | Tesanovic | H04W 76/14 370/312 |
| 2015/0043448 | A1* | 2/2015 | Chatterjee | H04W 8/005 370/329 |
| 2015/0365942 | A1* | 12/2015 | Niu | H04W 74/02 370/330 |
| 2016/0183276 | A1* | 6/2016 | Marinier | H04W 72/02 370/329 |

OTHER PUBLICATIONS

International Search Report and Written Opinion for International Patent Application No. PCT/CN2015/071043, dated Apr. 22, 2015, 9 pages.

\* cited by examiner

METHOD AND APPARATUS FOR D2D BASED ACCESS

This application is a 35 U.S.C. § 371 national phase filing of International Application No. PCT/CN2015/071043, filed Jan. 19, 2015, which claims the benefit of International Application No. PCT/CN2014/071545, filed Jan. 27, 2014, the disclosures of which are incorporated herein by reference in their entireties.

TECHNICAL FIELD

Embodiments herein generally relate to communications systems, and more particularly to a method, a base station (BS), a terminal device, and a computer readable storage medium for a Device-to-Device (D2D) based access.

BACKGROUND

This section introduces aspects that may facilitate a better understanding of the disclosure. Accordingly, the statements of this section are to be read in this light and are not to be understood as admissions about what is in the prior art or what is not in the prior art.

D2D communications are well-known and widely used in many existing wireless networks, e.g., ad hoc networks. Examples of D2D communications include communications in compliance with Bluetooth and several variants of Institute of Electrical and Electronic Engineers (IEEE) 802.11 standards suite, such as, Wireless Fidelity (WiFi) Direct. The systems of the above examples operate in an unlicensed spectrum.

Recently, in the third Generation Partnership Project (3GPP), D2D communications, as an underlay to cellular networks, has been proposed as an approach to take advantage of the proximity of communicating devices and at the same time to allow the devices to operate in a controlled interference environment. Typically, it is suggested that such D2D communications share the same spectrum as a cellular system, for example by reserving some of cellular uplink resources for the D2D communications. Allocating a dedicated spectrum for D2D communications is a less likely alternative because the spectrum is a scarce resource. Sharing, especially dynamic sharing between D2D services and cellular services is more flexible and may provide higher spectrum efficiency.

D2D communications may be ad hoc or network assisted. For example, a cellular network may assist a D2D connection by establishing security for the D2D connection and/or partly or fully controlling the setup of the D2D connection (e.g. device/peer discovery and resource allocation). A cellular network may also assist D2D communications by controlling the interference environment. For example, if using a licensed operator's spectrum for D2D communications, a higher reliability can be provided than operating in an unlicensed spectrum. To assist the D2D connection, the network may also provide synchronization and/or partial or full Radio Resource Management (RRM), which may e.g. comprise time and/or frequency resource allocation for D2D communications.

For D2D communications, the selection of an access scheme or mode, in particular whether the access scheme or mode should be contention free (CF) or contention based (CB), is still under discussion.

The contention based access scheme involves provision of a non-UE specific resource pool specifically allocated for D2D communications. The resource pool is either precon- figured for a UE capable of D2D communications (a D2D UE for short) when the UE is out of coverage of a cellular network (which will be referred to as "out-of-coverage scenario"), or configured via e.g. system information block (SIB) signaling when the UE is in coverage of the cellular network (which will be referred to as "in-coverage scenario"). The D2D UE then autonomously selects a resource within the pool and transmits data with the selected resource. With such a contention based access scheme, a collision between D2D UEs may occur if a plurality of UEs wants to initiate D2D communications using the same resource within the resource pool.

The contention free access scheme means that a central control entity (e.g. an evolved Node B (eNB) in a Long Term Evolution (LTE) system) allocates resources for a D2D UE when the UE wants to transmit data via D2D communications. For example, if a UE wants to initiate a D2D communication, the UE may inquiry its serving base station about available resources for the D2D communication. Then, the serving base station may allocate the resources dedicated for the UE and inform the UE. Subsequently, the UE may initiate the D2D communication using the allocated resources. With the contention free access scheme, the collision between D2D UEs can be avoided. However, it will take some time on requesting the base station to schedule resources for the D2D communication, which may increase the transmission delay.

The contention based access scheme is the only suitable solution for D2D communications in the out-of-coverage scenario. However for the in-coverage scenario, either contention based or contention free communication access scheme is possible.

Enabling D2D communications in a cellular network poses several challenges. The first issue facing D2D communications in the in-coverage scenario is the coexistence between the D2D system consisted of D2D UEs and the legacy cellular (e.g., LTE) system. Since D2D communications use LTE resources, it is inefficient to allocate dedicated resources for the D2D communications. From operator's point of view, the LTE system is more important than the D2D system because the commercial value of the LTE system is larger than that of the D2D system. So how to control D2D communications such that the LTE system would not be affected is an issue to solve.

The second issue facing D2D communications in the in-coverage scenario is how to avoid the conflict or collision in the contention based access scheme, and when to utilize the contention based access scheme and when to utilize the contention free access scheme.

SUMMARY

To address one or more of the above concerns, it would be desirable in the art to provide a solution for a D2D based access, i.e. the access of D2D communications.

In a first aspect, a method in a base station, BS, of a cellular radio system is provided. The method comprises obtaining at least one access control parameter for a D2D based access and transmitting a message including the at least one access control parameter to one or more terminal devices.

In some embodiments, the obtaining may be implemented by monitoring a load level of resources allocated for D2D communications and determining the at least one access control parameter based at least partly on the load level.

In some further embodiments, the method may further comprise adjusting the resources allocated for the D2D communications based on the load level and then monitoring the load level of the adjusted resources allocated the D2D communications.

In some further embodiments, the adjusting may be implemented by allocating more resources to the D2D communications based on the load level in a case that the load level is higher than a first threshold and free resources are available in the cellular radio system or reclaiming at least part of the resources allocated for the D2D communications based on the load level in a case that the load level is lower than a second threshold.

In some embodiments, the at least one access control parameter determined based on a first load level may allow more D2D based accesses than the at least one access control parameter determined based on a second load level does, with the first load level being lower than the second load level.

In some embodiments, the at least one access control parameter may include a barring factor indicating a probability that the D2D based access is allowed and a barring time indicating a time period that a terminal device should wait before retrying the D2D based access after being barred.

In some embodiments, the at least one access control parameter may include a barring bitmap indicating whether an access class to which a terminal device belongs is barred from the D2D based access.

In some embodiments, the message may be transmitted by broadcasting via a system information block message.

In some embodiments, the at least one access control parameter may be used for a D2D contention based access or for a D2D contention free access.

In a second aspect, a method in a terminal device of a cellular radio system is provided. The method comprises receiving a message from a base station of the cellular radio system. The message includes at least one access control parameter for a D2D based access. The method further comprises determining whether the D2D based access is allowed or barred based on the at least one access control parameter and initiating the D2D based access in response to determining that the D2D based access is allowed.

In some embodiments, the at least one access control parameter may be used for the D2D based access of a first type. In such embodiments, the D2D based access may be initiated by initiating the D2D based access of the first type in response to determining that the D2D based access of the first type is allowed based on the at least one access control parameter. The D2D based access may also be initiated by initiating the D2D based access of a second type in response to determining that the D2D based access of the first type is barred based on the at least one access control parameter.

In some further embodiments, before initiating the D2D based access of the second type, the method may further comprise determining whether the D2D based access of the second type is allowed or barred based on at least one access control parameter for the D2D based access of the second type received from the base station.

In some embodiments, the D2D based access of the first type may be one of a D2D contention based access and a D2D contention free access, and the D2D based access of the second type may be the other of the D2D contention based access and the D2D contention free access.

In some embodiments, the at least one access control parameter may include a barring factor indicating a probability that the D2D based access is allowed and a barring time indicating a time period that a terminal device should wait before retrying the D2D based access after being barred.

In some other embodiments, the at least one access control parameter may include a barring bitmap indicating whether an access class to which a terminal device belongs is barred from the D2D based access.

In a third aspect, a base station of a cellular radio system is provided. The base station comprises an obtaining module configured to obtain at least one access control parameter for a D2D based access and a transmitting module configured to transmit a message including the at least one access control parameter to one or more terminal devices.

In a fourth aspect, a terminal device of a cellular radio system is provided. The terminal device comprises a receiving module configured to receive a message from a base station of the cellular radio system. The message includes at least one access control parameter for a D2D based access. The terminal device further comprises a determining module configured to determine whether the D2D based access is allowed or barred based on the at least one access control parameter and an initiating module configured to initiate the D2D based access in response to determining by the determining module that the D2D based access is allowed.

In a fifth aspect, a base station of a cellular radio system is provided. The base station comprises a processor and a memory. The memory contains instructions executable by the processor, whereby the base station is operative to obtain at least one access control parameter for a D2D based access and to transmit a message including the at least one access control parameter to one or more terminal devices.

In a sixth aspect, a base station of a cellular radio system is provided. The base station comprises processing means adapted to obtain at least one access control parameter for a D2D based access and to transmit a message including the at least one access control parameter to one or more terminal devices.

In a seventh aspect, a terminal device of a cellular radio system is provided. The terminal device comprises a processor and a memory. The memory contains instructions executable by the processor, whereby the terminal device is operative to receive a message from a base station of the cellular radio system. The message includes at least one access control parameter for a D2D based access. The terminal device is further operative to determine whether the D2D based access is allowed or barred based on the at least one access control parameter and to initiate the D2D based access in response to determining that the D2D based access is allowed.

In an eighth aspect, a terminal device of a cellular radio system is provided. The terminal device comprises processing means adapted to receive a message from a base station of the cellular radio system. The message includes at least one access control parameter for a D2D based access. The processing means is further adapted to determine whether the D2D based access is allowed or barred based on the at least one access control parameter and to initiate the D2D based access in response to determining that the D2D based access is allowed.

In a ninth aspect, a non-transitory computer-readable storage media having computer program code stored thereon is provided. The computer program code is configured to, when executed, cause an apparatus to perform actions in the method according to the first aspect as above described.

In a tenth aspect, a non-transitory computer-readable storage media having computer program code stored thereon is provided. The computer program code is configured to, when executed, cause an apparatus to perform actions in the method according to the second aspect as above described.

It should be appreciated that, corresponding embodiments of the first aspect are also applicable for the third aspect, the fifth aspect, the sixth aspect, and the ninth aspect. Similarly, corresponding embodiments of the second aspect are also applicable for the fourth aspect, the seventh aspect, the eighth aspect, and the tenth aspect.

With particular embodiments of the techniques described in this specification, by informing terminal devices of one or more access control parameters for a D2D based access, the base station may control the access of D2D communications. In this way, it is possible to reduce the influence of the D2D access to the legacy cellular system, e.g. LTE system.

Other features and advantages of the embodiments herein will also be understood from the following description of specific embodiments when read in conjunction with the accompanying drawings, which illustrate, by way of example, the principles of embodiments.

BRIEF DESCRIPTION OF THE DRAWINGS

The above and other aspects, features, and benefits of various embodiments herein will become more fully apparent, by way of example, from the following detailed description and the accompanying drawings, in which.

Like reference numbers and designations in the various drawings indicate like elements.

DETAILED DESCRIPTION

Figure 1:
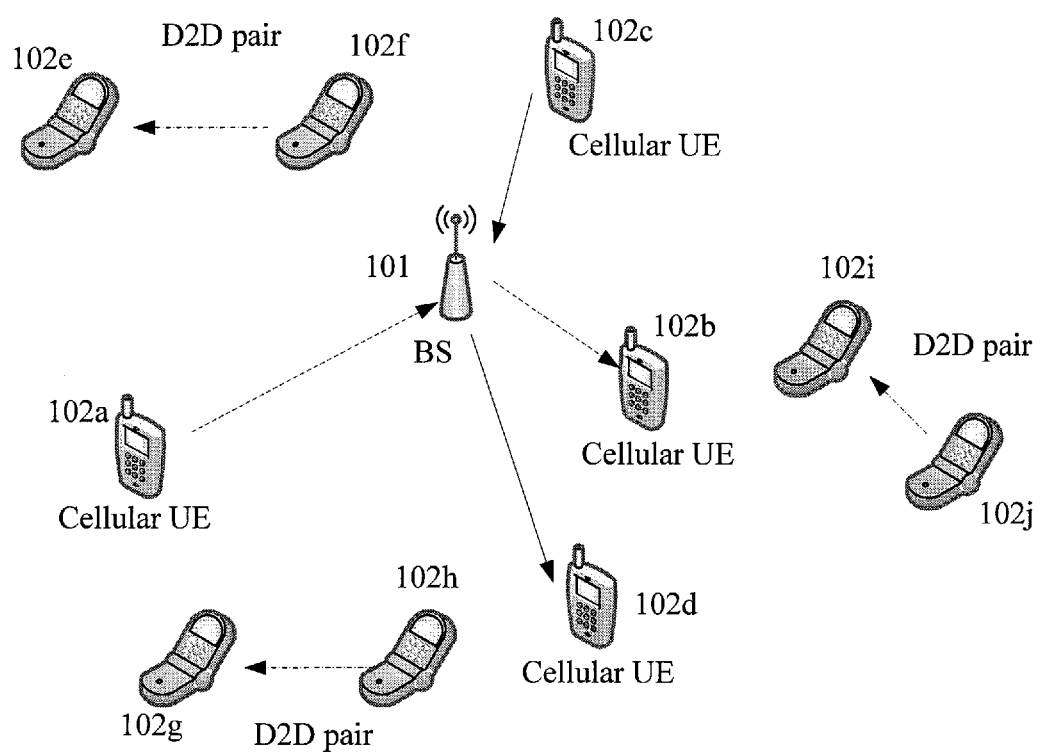
FIG. 1 illustrates an exemplary scenario where embodiments herein may be applied.

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

In the following description, a base station (BS) used herein is an entity for allocating resources to a terminal and may be referred to as e.g. an enhanced Node B (eNB), a NodeB, a radio access unit, a base station controller, or a base transceiver station (BTS) etc. depending on the technology and terminology used. A terminal device used herein may be a user equipment (UE), including but not limited to a mobile station (MS), a mobile unit, a cellular phone, a smart phone, a personal digital assistant (PDA), a computer or any portable units or terminals that have wireless communications capabilities, or a multimedia system equipped with a communications function. A D2D UE used herein refers to a UE capable of D2D communications. Please note that, the terms "terminal device" and "user equipment" or "UE" may be used interchangeably hereinafter.

While embodiments are described below in the context of an LTE type cellular network for illustrative purposes, those skilled in the art will recognize that the embodiments disclosed herein can also be applied to various other types of cellular networks.

Currently, the IEEE 802.11 wireless local area network (WLAN) like mechanism may be reused for the D2D contention based access scheme. In details, in a Carrier Sense Multiple Access with Collision Avoidance (CSMA/CA) mechanism, before a UE starts to transmit data, the UE sets a back-off timer. During the period as set by this back-off timer, the UE continuously monitors whether the channel to be used is free or not. If the channel is free for one slot, the back-off timer can be reduced by 1; otherwise, the back-off timer is kept unchanged. When the timer expires, the UE assumes that the channel is free and it may prepare to transmit data. This mechanism may be power consuming.

The advantage of the D2D contention based access scheme may be that it can provide lower latency under a lower load because the D2D UE can transmit data without prior signaling to and from the eNB. However, when the load in the D2D system becomes higher, i.e., more D2D UEs want to transmit data in the system, the collision probability between the UEs will increase and then the resource utilization efficiency will decrease dramatically. On the contrary, the advantage of the contention free based access scheme may lie in high resource efficiency under a high load, while the transmission delay is a bit longer under a low load.

According to embodiments herein, a network-assisted D2D access scheme is provided. By informing UEs of one or more access control parameters for a D2D based access from a base station, the base station may control the access of D2D communications. In this way, the influence to the legacy cellular system, e.g. LTE system, may be reduced. In some further embodiments, a mechanism to redirect between the contention based access scheme and the contention free access scheme is provided, such that advantages of both the contention based and the contention free access schemes may be achieved.

FIG. 1 illustrates an exemplary scenario where embodiments herein may be applied. The concept of D2D communications underlaying an LTE network is exemplarily shown in FIG. 1. Instead of using uplink and downlink resources in the cellular mode, a direct connection between UEs is allowed through peer-to-peer communications. Some example applications of D2D communications are multimedia downloading, video streaming, online gaming, and peer-to-peer file sharing.

FIG. 1 shows a base station BS 101 and a plurality of UEs 102*a-j* (which may be referred to as 102 collectively hereafter) in communications within a coverage area (not shown, also referred to as a cell) served by the base station 101. The base station 101 is capable of communicating with wireless terminal devices, such as UEs 102 within the coverage area. Some UEs may communicate with each other via the base station 101 using cellular communications, while some other UEs may communicate with each other using a direct connection, i.e., using D2D communications. For a simplicity purpose, in the following, a UE in cellular communications may be referred to as a cellular UE, and a UE in D2D communications may be referred to as a D2D UE. For example, cellular UE 102*a* may communicate with cellular UE 102*b* via the base station 101; and cellular UE 102*c* may communicates with cellular UE 102*d* via the base station 101, while UE 102*e* and UE 102*f* may communicate with each other directly and form a D2D pair; UE 102*g* and UE 102*h* may communicate with each other directly and form another D2D pair; and UE 102*i* and UE 102*j* may communicate with each other directly and form yet another D2D pair.

In some implementations, the base station 101 may be implemented as an evolved Node B (eNB) in compliance with the Long Term Evolution (LTE) standards. The base station 101 may also be implemented in compliance with IEEE 802.16 standards. The base station 101 may have wired and/or wireless backhaul links to other network nodes, such as other base stations, a radio network controller, a serving gateway, and the like.

The UEs may be mobile and/or stationary. The UEs may be implemented as, for example, a wireless handheld device, a wireless plug-in accessory, or the like. For example, the UEs may take the form of a wireless phone, a computer with a wireless connection to a network, or the like. In some cases, the UEs may include one or more of the following: at least one processor, at least one computer-readable storage medium (e.g., memory, storage, and the like), a radio access mechanism, and a user interface.

Note that in FIG. 1 only one base station 101 is shown. In practice, there may be a number of base stations. Further, within the cell served by the base station 101, there may be a large number of UEs, and the D2D pair may be more complicated than those as shown in FIG. 1. For example, three or more UEs may be grouped into a D2D cluster where every two UEs have direct or indirect association via D2D communications. The skilled in the art should appreciate that the scenario as shown in FIG. 1 is only an example to illustrate the environment where embodiments herein may be applied without limiting the present disclosure in any way.

Figure 2:
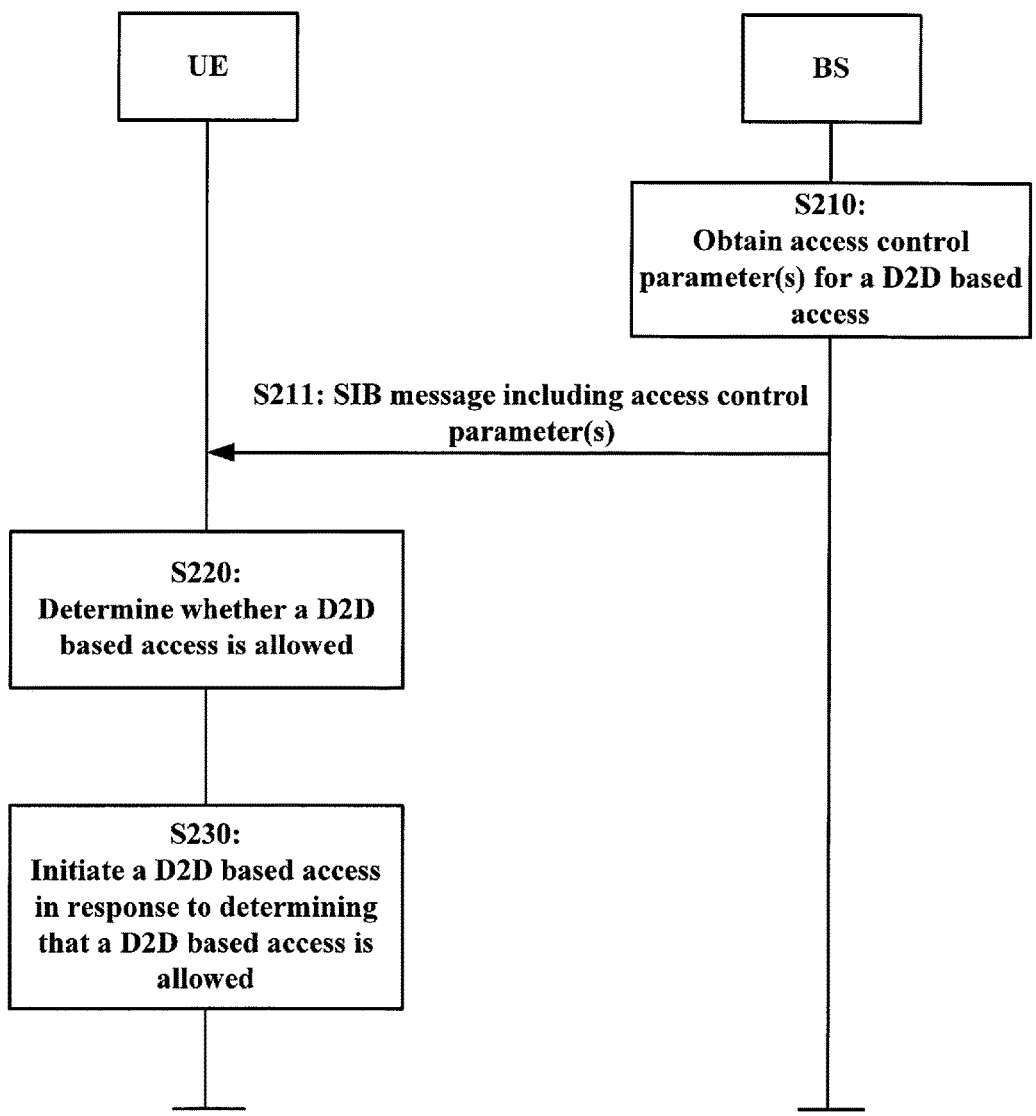
FIG. 2 illustrates an example of a signaling flow according to embodiments herein.

FIG. 2 illustrates an example of a signaling flow for a D2D based access between a UE and a base station (e.g., an eNB) according to embodiments herein.

As shown in block S210, the base station obtains one or more access control parameters for a D2D based access. The access control parameters may be determined based on several factors, for example, a load level of resources allocated for D2D communications which may be obtained from load information of cellular services and load information of D2D services, QoS requirements of cellular UEs, the number of cellular UEs, resource usage, etc. The load level of resources refers to a metric indicating utilization efficiency of the resources. As mentioned previously, there are two types of D2D based access modes, i.e. contention free (CF) and contention based (CB). The above access control parameter(s) may be provided either for a D2D contention free access or for a D2D contention based access. Thus, the two types of D2D based access may be controlled individually.

Then, in S211, the base station transmits a message including the obtained one or more access control parameters to one or more UEs. Preferably, the message is a system information block (SIB) message broadcasted by the base station.

In some embodiments, the access control parameters may include a barring factor indicating a probability that the D2D based access is allowed and a barring time indicating a time period that a UE should wait before retrying the D2D based access after being barred. To inform a UE of these access control parameters, new information elements (IEs) may be added into a SIB message (e.g., SIB2) to implement the admission control of the D2D based access. The following illustrates an example of the added new IE.

```
D2DAC-BarringConfig ::=   SEQUENCE {
    d2dac-BarringFactor       ENUMERATED {
                                p00, p05, p10, p15, p20, p25, p30, p40,
                                p50, p60, p70, p75, p80, p85, p90, p95,
                                p100},
    d2dac-BarringTime         ENUMERATED {s4, s8, s16, s32, s64,
                                s128, s256, s512},
}
```

These parameters are based on a newly defined capacity category for a D2D based access. In more details, the parameter <d2dac-BarringFactor> is used to notify a D2D UE of the probability that the D2D based access is allowed. The values of this parameter are interpreted in a range [0,1]: p00=0, p05=0.05, p10=0.10, . . . , p95=0.95, p100=1. "1" means that the D2D based access may be initiated without any additional limitation, while "0" means that the D2D based access is barred and may not be initiated at all.

The parameter <d2dac-BarringTime> is used to indicate a time period that a UE should wait before retrying a D2D based access after being barred. The values of this parameter are access barring time values in seconds.

In some other embodiments where each UE belongs to a predefined access class which may be allowed or barred as a whole for a D2D based access, information regarding the access class to which a UE belongs may be stored in the UE. In these embodiments, the access control parameters may include a barring bitmap indicating whether an access class to which a UE belongs is barred from the D2D based access. To inform a D2D UE of these access control parameters, another new IE may be added into a SIB message (e.g., SIB14) to implement refined barring of the D2D based access. The following illustrates an example of the added new IE.

```
D2DAC-BarringConfig ::=         SEQUENCE {
    d2d-BarringBitmap             BIT STRING (SIZE (10))
}
```

This new IE is based on a newly defined capacity category for a D2D based access and a newly assigned access class for each D2D UE from 0 to 9. The parameter <d2d-BarringBitmap> is used to notify which access class a D2D UE belongs to is barred. For example, the first bit in <d2d-BarringBitmap> may correspond to access class 0 and the last bit in <d2d-BarringBitmap> may correspond to access class 9. Value "1" may mean that the D2D based access is barred and value "0" may mean that the D2D based access is not barred, i.e., allowed.

The skilled in the art may appreciate that, the values of these parameters are merely illustrative, and other values may also be used to indicate those D2D access control information. For example, in <d2d-BarringBitmp>, value "1" may mean that the D2D based access is allowed, while value "0" may mean that the D2D based access is barred. The skilled in the art may also appreciate that the above mentioned two IEs, i.e., two access control parameters, can be either applied independently or jointly for D2D communications. Further, the skilled in the art may understand that other information elements may also be used to carry the one or more access control parameters.

Going on with FIG. 2, in block S220, when the UE wants to initiate a D2D based access, the UE determines whether the D2D based access is allowed or barred according to D2D access control information, i.e., the one or more access control parameters received from the base station.

If the D2D access control information includes a barring factor and a barring time e.g. carried in SIB2, the UE would draw a random value p in the range [0, 1]. If p is lower than the value indicated by <d2dac-BarringFactor> included in SIB2, it is determined that the D2D based access is allowed. Then, the UE may initiate the D2D based access in block S230. Otherwise, it is determined that the D2D based access is barred, and the UE should wait for a time period as indicted by <d2dac-BarringTime> included in SIB2. Upon the time period expires, the UE may retry the D2D based access.

If the D2D access control information includes a barring bitmap e.g. carried in SIB14, the UE will check whether an access class to which the UE belongs is barred. The access class of the UE may be stored in its memory, such as a Universal Subscriber Identity Module (USIM), with a value in the range of 0 to 9. If for the access class of the UE, as stored on the USIM, the corresponding bit in the <d2d-BarringBitmap> is set to "0", it is determined that the D2D based access is allowed. Then, the UE may initiate the D2D based access in block S230. Otherwise if the corresponding bit in the <d2d-BarringBitmap> is set to "1", it is determined that the D2D based access is barred, and the UE may not initiate the D2D based access.

As mentioned above, the two IEs, i.e., two access control parameters, can be either applied independently or jointly for D2D communications. When applied jointly, the UE may firstly check whether an access class to which the UE belongs is barred according to the parameter <d2d-BarringBitmap>. If the access class of the UE is allowed, then the UE may further determine whether the D2D based access is allowed according to the parameter <d2dac-BarringFactor>. By combining these two IEs, refined control of the D2D based access may be implemented.

The above thus has described the signaling flow between the base station and the user equipment according to some embodiments disclosed herein. By informing UEs of one or more access control parameters for a D2D based access, the base station may control the access of D2D communications. In particular, when the D2D system uses the same resources as the legacy LTE system, e.g., in D2D contention free access mode, the base station may set the values of the access control parameters to allow or bar the D2D based access, such that the LTE system may be protected. If there are only D2D contention based accesses, the proposed network-assisted access control may help to save D2D UE power because it is not necessary for the D2D UE to monitor the shared resource pool all the time to check whether it is suitable to initiate a D2D based access or not. The D2D UE may know this situation from the SIB message sent by the base station and the reading of this SIB message may be on a fixed time occurrence.

In the following, exemplary methods performed in the base station and in the user equipment will be described individually, and some additional operations may be performed in these embodiments.

Figure 3:
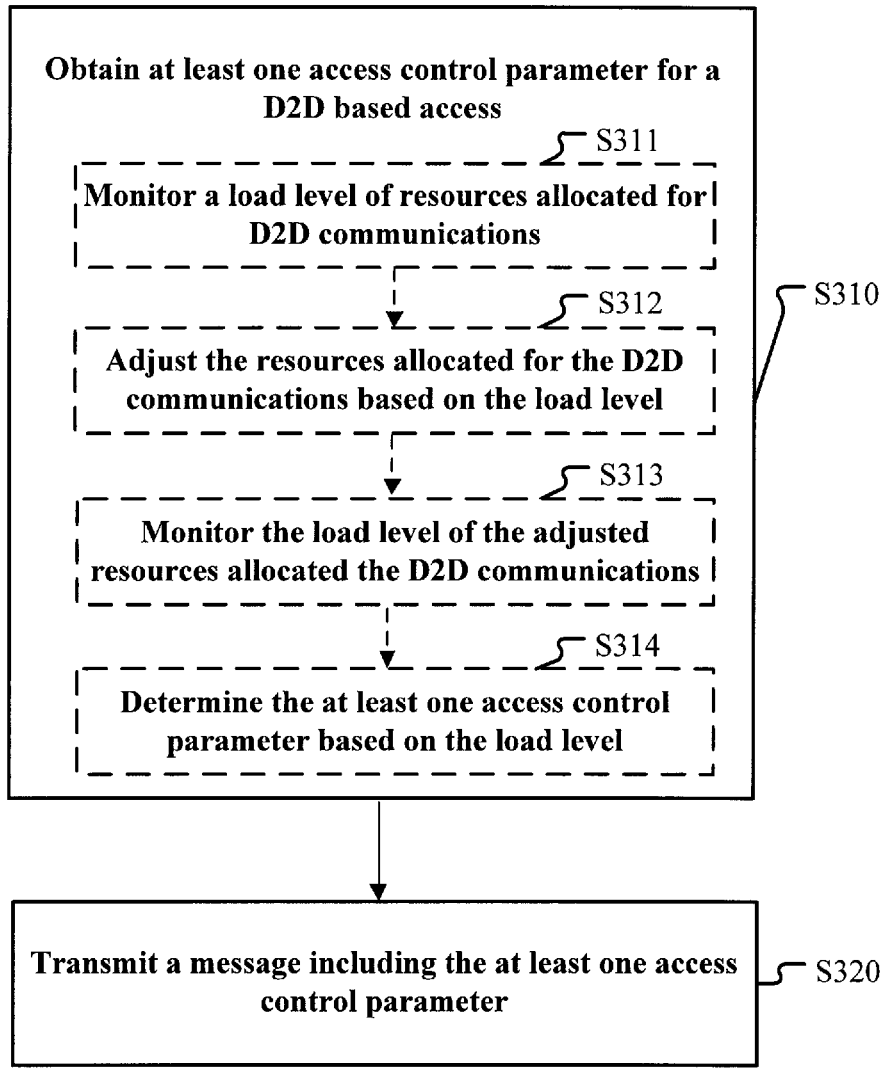
FIG. 3 illustrates an exemplary flowchart of a method in a base station according to embodiments herein.

FIG. 3 illustrates an exemplary flowchart of a method in a base station of a cellular radio system according to embodiments herein.

In block S310, the base station obtains at least one access control parameters for a D2D based access. As mentioned previously, the access control parameters may be determined based on several factors, for example, a load level of resources allocated for D2D communications which may be obtained from load information of cellular services, load information of D2D services, QoS requirements of cellular UEs, the number of cellular UEs, resource usage, etc. Thus, in some embodiments, e.g., for the D2D contention based access mode, the at least one access control parameters may be obtained by monitoring a load level of resources allocated for D2D communications in block S311, and then determining the at least one access control parameter based at least partly on the load level in block S314. The skilled in the art may appreciate that, for the D2D contention free access mode, some other factors (e.g., the load information of cellular services, etc.) may be monitored and used to determine or adjust the access control parameters. Here, it is assumed that the access control parameters are used for a D2D contention based access.

The monitoring of the load level may be implemented at the base station. This is viable as the transmission power of a D2D UE is comparable to (e.g., 23 dBm) or higher than (e.g., 31 dBm) that of a cellular UE, and thereby the base station may know whether resources allocated for D2D communications are used by the D2D UE or not. Alternatively, D2D UEs may report the load level (e.g., a collision probability) to the base station.

In some embodiments, the load level may be represented by a busy/free ratio of the resources which are allocated for D2D communications, especially for contention based communications. For example, for every N transmission time intervals (TTIs), the base station may check how many resources are used for D2D contention based communications versus how many resources are not used, thereby calculating the busy/free ratio. Alternatively, the load level may be represented by a collision probability. For example, the base station may check the number of TTIs in which there is a collision between D2D UEs to transmit data versus the number of TTIs in which there is no collision, thereby calculating the collision probability.

With this busy/free ratio or collision probability, the base station may know the load level in the D2D system. Based at least partly on the load level, the base station may determine the values of the access control parameters as described above.

One or more criteria may be used to determine the values of the access control parameters based on the load level. In some embodiments, the criteria may be predefined by multiple thresholds associated with the load level. As an example, there may be N thresholds $TH_i$, where $i=1, 2, \ldots, N$ and $TH_i < TH_{i+1}$, resulting in a series of ranks: $0 \sim TH_1, TH_1 \sim TH_2, \ldots, TH_{N-1} \sim TH_N$. Different ranks may correspond to different values of the access control parameters. For example, if the monitored load level L falls within the range of $TH_1 \sim TH_2$, the value of the parameter <d2dac-BarringFactor> may be set as "p95", and the value of the parameter <d2dac-BarringTime> may be set as "s8"; and/or the value of the parameter <d2d-BarringBitmap> may be set to allow access classes from 0 to 9, e.g., "0000000001". The skilled in the art may appreciate that granularity of the load level (i.e., the number of the thresholds) may be varied according to specific implementations, and it is not necessary to be consistent with the granularity of the access control parameters.

The above criteria may be maintained by a data structure (e.g., a table) which stores the mapping between the thresholds of the load level and the values of the access control parameters.

Some other criteria may also be applicable. For example, since the monitoring is performed continuously, the variation of the load level may be calculated. In response that the variation exceeds a predetermined threshold, the value(s) of the access control parameter(s) may be adjusted. The adjustment step can be predefined in the criteria.

No matter what kind of criteria are adopted, generally, the at least one access control parameter determined based on a first load level allows more D2D based accesses than the at least one access control parameter determined based on a second load level that is higher than the first load level. In other words, the higher the load level is, more D2D based accesses are barred, i.e., the lower the value of the parameter <d2dac-BarringFactor> is, or the more bits in the parameter <d2d-BarringBitmap> are set to "1". Similarly, the lower the load level, less D2D based accesses are barred, i.e., the higher the value of the parameter <d2dac-BarringFactor> is, or the more bits in the parameter <d2d-BarringBitmap> are set to "0".

The monitoring may be performed continuously or periodically, such that the access control parameters may be adjusted in real time or almost real time, e.g., in a short period.

In some embodiments, before the at least one access control parameter is determined, the base station may adjust in block S312 the resources allocated for the D2D communications based on the monitored load level in block S311. For example, in a case that the load level is higher than a predetermined threshold and there are free resources available in the cellular radio system, the base station may allocate more resources to the D2D communications based on the load level. In a case that the load level is lower than another predetermined threshold, the base station may reclaim at least part of the resources allocated for the D2D communications based on the load level.

In these embodiments, once the resources allocated for the D2D communications are adjusted, the base station may monitor in block S313 a load level of the adjusted resources, i.e. all resources currently allocated for the D2D communications.

Following the determination of the at least one control parameter, in block S320, the base station transmits a message including the obtained one or more access control parameters to one or more user equipments. In an example, the message may be a system information block (SIB) message broadcasted by the base station. For example, the parameters <d2dac-BarringFactor> and <d2dac-BarringTime> may be carried in SIB2, while the parameter <d2d-BarringBitmap> may be carried in SIB14.

From the above description, it can be seen that, for D2D contention based accesses, collisions between D2D UEs may be avoided/reduced as much as possible by determining/adjusting the access control parameters based on the monitored load level of the resources allocated for D2D communications. In some other embodiments, for D2D contention free access mode which uses the same resources with the legacy LTE system, if some other factors (e.g., the load information of cellular services, etc.) is monitored and used to determine or adjust the access control parameters, the load balance between the legacy LTE system and the D2D system may be achieved. For example, if the load of cellular services is high, more D2D contention free accesses are barred; if the load of cellular services is low, less D2D contention free accesses are barred, i.e., encouraging the D2D contention free communications.

Figure 4:
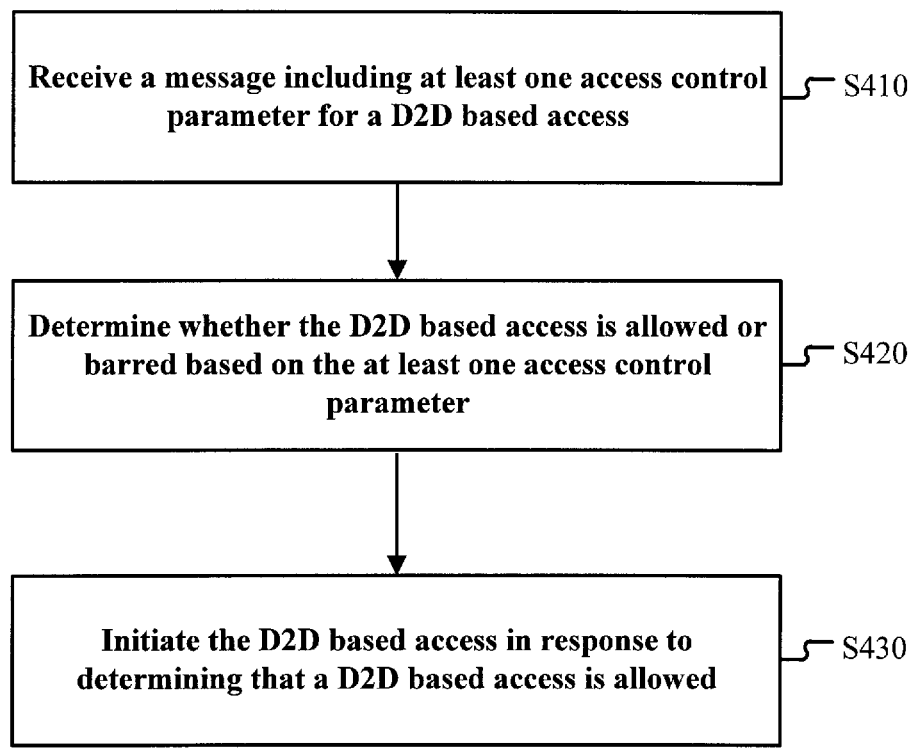
FIG. 4 illustrates an exemplary flowchart of a method in a terminal device according to some embodiments herein.

FIG. 4 illustrates an exemplary flowchart of a method in a UE according to some embodiments herein.

In block S410, the UE receives a message including at least one access control parameter for a D2D based access. As described with respect to the method in the base station, the message may be a SIB message. For example, the parameters <d2dac-BarringFactor> and <d2dac-BarringTime> may be carried in SIB2, while the parameter <d2d-BarringBitmap> may be carried in SIB14.

Then, in block S420, the UE determines whether a D2D based access is allowed or barred based on the at least one access control parameter received from the base station. The UE may make such determination when it wants to initiate a D2D based access.

The manner of the determination depends on the received access control parameter. If the at least one access control parameter includes the parameters <d2dac-BarringFactor> and <d2dac-BarringTime>, the UE would draw a random value p in the range of [0, 1]. If p is lower than the value indicated by <d2dac-BarringFactor>, it is determined that the D2D based access is allowed. Then, the UE initiates the D2D based access in block S430. Otherwise, it is determined that the D2D based access is barred, and the UE should wait for a time period as indicted by <d2dac-BarringTime>. When the time period expires, the UE may retry the D2D based access.

If the at least one access control parameter includes the parameter <d2d-BarringBitmap>, the UE will check whether an access class to which the UE belongs is barred. If for the access class of the UE, e.g. as stored on the USIM, the corresponding bit in the <d2d-BarringBitmap> is set to "0", it is determined that the D2D based access is allowed. Then, the UE initiates the D2D based access in block S430. Otherwise, if the corresponding bit in the <d2d-BarringBitmap> is set to "1", it is determined that the D2D based access is barred, and the UE may not initiate a D2D based access.

As mentioned above, the two IEs, i.e., two access control parameters, can be either applied independently or jointly for D2D communications. When applied jointly, the UE may firstly check whether an access class to which the UE belongs is barred according to the parameter <d2d-BarringBitmap>. If the D2D based access is allowed, then the UE may further determine whether the D2D based access is allowed according to the parameter <d2dac-BarringFactor>. By combining these two IEs, refined control of the D2D based access may be implemented.

Further, as described previously, there are two types of D2D based access modes, contention free (CF) and contention based (CB). The above access control parameter(s) may be provided either for a D2D contention free access or for a D2D contention based access. Thus, the two types of D2D based access may be controlled individually or in combination.

Figure 5:
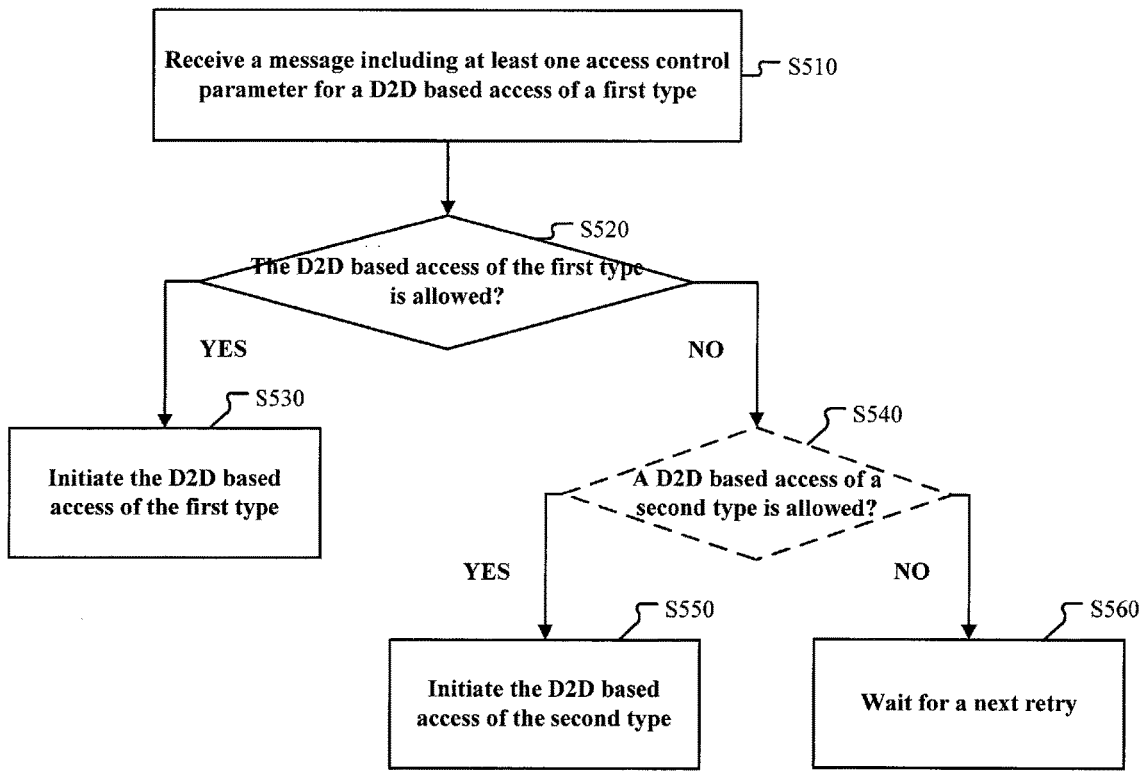
FIG. 5 illustrates an exemplary flowchart of a method in a terminal device according to some further embodiments herein.

FIG. 5 illustrates an exemplary flowchart of a method in a UE according to some further embodiments where the two types of D2D based access are controlled in combination. In block S510, the UE receives a message including at least one access control parameter for a D2D based access of a first type. The message may be a SIB message. For example, the parameters <d2dac-BarringFactor> and <d2dac-BarringTime> may be carried in SIB2, while the parameter <d2d-BarringBitmap> may be carried in SIB14.

Then, in block S520, when the UE e.g. wants to initiate a D2D based access, the UE determines whether the D2D based access of the first type is allowed or barred based on the at least one access control parameter received from the base station. The manner of the determination depends on the received access control parameter, which has been detailed with reference to FIGS. 2 and 4 and will be omitted herein for a simplicity purpose.

In block S530, in response to determining that the D2D based access of the first type is allowed, the UE may initiate the D2D based access of the first type.

Otherwise, in response to determining that the D2D based access of the first type is barred, the UE may be redirected to a D2D based access of a second type. In other words, the UE may initiate the D2D based access of the second type once it is determined that the D2D based access of the first type is barred, i.e., the process may jump to block S550 (the jump is not shown in FIG. 5).

Optionally, before initiating the D2D based access of the second type, the UE may determine in block S540 whether the D2D based access of the second type is allowed or barred based on at least one access control parameter for a D2D based access of the second type received from the base station. Similar to the access control parameter(s) for a D2D based access of the first type, the access control parameter(s) for the D2D based access of the second type may also be broadcasted by the base station in a SIB message. Depending on specific implementations, the SIB message for the access control parameter(s) for a D2D based access of the second type may be separated from or in combination with the SIB message for the access control parameter(s) for a D2D based access of the first type. The manner of the determination in block S540 may be similar to that in block S520.

Then, in block S550, in response to determining that the D2D based access of the second type is allowed, the UE may initiate the D2D based access of the second type. Otherwise, in block S560, the UE may wait for a next retry.

In the above embodiments, the D2D based access of the first type may be one of a D2D contention based access and a D2D contention free access, and the D2D based access of the second type may be the other of the D2D contention based access and the D2D contention free access. Through redirection between the two types of D2D based accesses, load balance can be achieved and the advantages of both the D2D contention based access and the D2D contention free access can be obtained.

In an example, the first type may be the D2D contention based access, and the second type may be the D2D contention free access. In such an example, when the load level is low, the D2D contention based access is encouraged, and then a lower transmission delay is achieved. When the load level is high, some UEs are redirected to the D2D contention free access, and then the load level for the D2D contention based access may be reduced. In this way, the low spectrum efficiency of the D2D contention based access is avoided, and the high spectrum efficiency of the D2D contention free access is achieved.

In another example, the first type may be the D2D contention free access, while the second type may be the D2D contention based access. For example, this case may happen during a hard handover of the UE from a source base station, i.e. the above base station, to a target base station, particularly before a connection is established between the UE and the target base station after the UE has disconnected from the source base station.

Figures 6, 7:
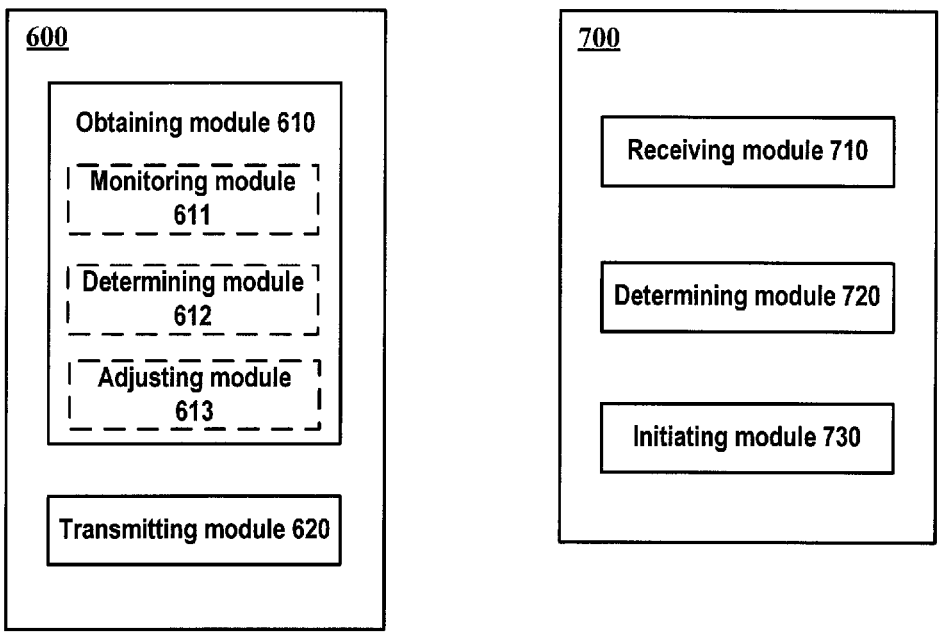
FIG. 6 illustrates a schematic block diagram of a base station that may be configured to practice the exemplary embodiments herein.
FIG. 7 illustrates a schematic block diagram of a terminal device that may be configured to practice the exemplary embodiments herein.

FIG. 6 illustrates a schematic block diagram of a base station 600 that may be configured to practice the exemplary embodiments herein.

As shown in FIG. 6, the base station 600 comprises an obtaining module 610 and a transmitting module 620.

The obtaining module 610 is configured to obtain at least one access control parameters for a D2D based access.

In some embodiments, the obtaining module 610 may comprise a monitoring module 611 and a determining module 612. The monitoring module 611 may be configured to monitor a load level of resources allocated for D2D communications. The determining module 612 may be configured to determine the at least one access control parameter based at least partly on the load level monitored by the monitoring module 611. The skilled in the art may appreciate that, the monitoring module 611 may be configured to monitor some other factors (e.g., the load information of cellular services or D2D services, etc.), and the determining module 612 may be configured to take these factors into account when determining the access control parameters. The detailed operations performed by the monitoring module 611 and the determining module 612 have been described with reference to FIG. 3 and thus the description thereof is omitted here.

In some further embodiment, the obtaining module 610 may further comprise an adjusting module 613 configured to adjust the resources allocated for the D2D communications based on the load level. In these embodiments, the monitoring module 611 is further configured to monitor the load level of the adjusted resources allocated the D2D communications. The detailed operations performed by the adjusting module 613 have been described with reference to FIG. 3 and thus the description thereof is omitted here.

The transmitting module 620 is configured to transmit a message including the obtained one or more access control parameters to one or more user equipments. In an example, the message may be a system information block (SIB) message broadcasted by the base station.

It should be understood that the modules 610-620 contained in the base station 600 are configured for practicing exemplary embodiments herein. Thus, the operations and features described above with respect to FIGS. 2 and 3 also apply to the apparatus 600 and the modules therein, and the detailed description thereof is omitted here for a simplicity purpose.

FIG. 7 illustrates a schematic block diagram of a terminal device 700 that may be configured to practice the exemplary embodiments herein.

As shown in FIG. 7, the terminal device 700 comprises a receiving module 710, a determining module 720, and an initiating module 730.

The receiving module 710 is configured to receive a message from a base station of a cellular radio system. The message includes at least one access control parameter for a D2D based access. In some embodiments, the at least one access control parameter may include a barring factor indicating a probability that the D2D based access is allowed and a barring time indicating a time period that the terminal device should wait before retrying the D2D based access after being barred. Alternatively or additionally, the at least one access control parameter may include a barring bitmap indicating whether an access class to which the terminal device belongs is barred from the D2D based access.

The determining module 720 is configured to determine whether the D2D based access is allowed or barred based on the at least one access control parameter.

The initiating module 730 is configured to initiate the D2D based access in response to determining by the determining module 720 that the D2D based access is allowed.

In some embodiments, the at least one access control parameter may be used for a D2D based access of a first type and the initiating module 730 may be configured to initiate the D2D based access of the first type in response to determining by the determining module 720 that the D2D based access of the first type is allowed based on the at least one access control parameter. In such embodiments, the initiating module 730 may be further configured to initiate a D2D based access of a second type in response to determining by the determining module 720 that the D2D based access of the first type is barred based on the at least one access control parameter.

In some further embodiments, the determining module 720 may be further configured to determine whether the D2D based access of the second type is allowed or barred based on at least one access control parameter for the D2D based access of the second type received from the base station. In such embodiments, the initiating module 730 may be further configured to initiate the D2D based access of the second type only if it is determined by the determining module 720 that the D2D based access of the second type is allowed.

In the above embodiments, the D2D based access of the first type may be one of a D2D contention based access and a D2D contention free access, and the D2D based access of the second type may be the other of the D2D contention based access and the D2D contention free access.

It should be understood that the modules 710-730 contained in the terminal device 700 are configured for practicing exemplary embodiments herein. Thus, the operations and features described above with respect to FIGS. 2, 4 and 5 also apply to the terminal device 700 and the modules therein, and the detailed description thereof is omitted here.

Figure 8:
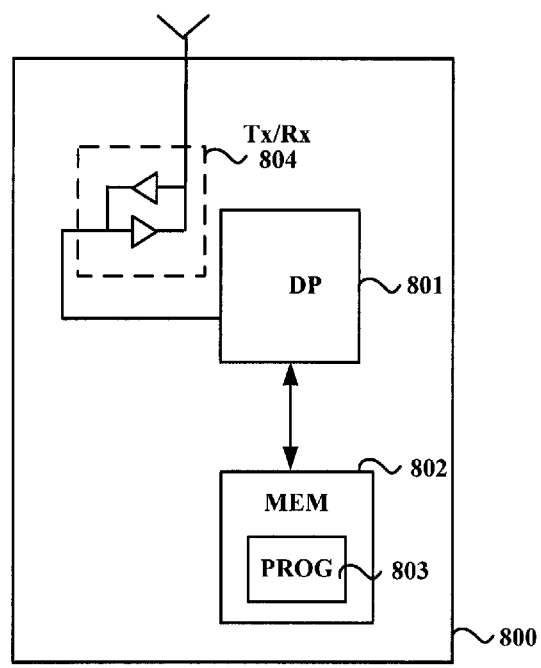
FIG. 8 illustrates a simplified block diagram of an entity that is suitable for use in practicing exemplary embodiments of the present invention.

FIG. 8 illustrates a simplified block diagram of an entity 800 that is suitable for use in practicing exemplary embodiments of the present invention. The entity 800 may be an entity at the network side, for example, a base station, or an entity at the user side, e.g., a terminal device.

As shown in FIG. 8, the entity 800 includes a data processor (DP) 801, a memory (MEM) 802 coupled to the DP 801, and a suitable RF transmitter TX and receiver RX 804 coupled to the DP 801. The MEM 802 stores a program (PROG) 803. The TX/RX 804 is for bidirectional wireless communications. Note that the TX/RX 804 has at least one antenna to facilitate communication, though in practice a BS or a terminal device may have several. The entity 800 may be coupled via a data path to one or more external networks or systems, such as the internet, for example.

The PROG 803 is assumed to include program instructions that, when executed by the associated DP 801, enable the entity 800 to operate in accordance with the exemplary embodiments of this invention, as discussed herein with the methods in FIGS. 2-5. For example, the PROG 803 and the DP 801 may embody the determining module 612 and the determining module 720 to perform the respective functions. The PROG 803, the DP 801, and the TX/RX 804 may work together to embody the monitoring module 611, the transmitting module 620, the receiving module 710, and the initiating module 730 to perform the respective functions.

The embodiments of the present invention may be implemented by computer software executable by the DP 801 of the entity 800, or by hardware, or by a combination of software and hardware.

The MEM 802 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the entity 800, there may be several physically distinct memory units in the entity 800. The DP 801 may be of any type suitable to the local technical environment, and may include one or more of general purpose computers, special purpose computers, microprocessors, digital signal processors (DSPs) and processors based on multicore processor architecture, as non limiting examples. The entity 800 may have multiple processors, such as for example an application specific integrated circuit chip that is slaved in time to a clock which synchronizes the main processor.

Exemplary embodiments herein have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be appreciated that the above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the

What is claimed is:

1. A method in a base station of a cellular radio system, the method comprising:
obtaining at least one access control parameter for a device-to-device, D2D, based access, wherein said at least one access control parameter can be used to redirect between D2D contention based access and D2D contention free access depending on whether access is allowed for D2D contention based access or for D2D contention free access, and wherein said at least one access control parameter includes a barring factor indicating a probability that the D2D based access is allowed and a barring time indicating a time period that a terminal device waits before retrying the D2D based access after being barred; and
transmitting a message including said at least one access control parameter to one or more terminal devices.

2. The method of claim 1, wherein said obtaining comprises:
monitoring a load level of resources allocated for D2D communications; and
determining said at least one access control parameter based at least partly on the load level.

3. The method of claim 2, further comprising:
adjusting the resources allocated for the D2D communications based on the load level; and
monitoring the load level of the adjusted resources allocated for the D2D communications.

4. The method of claim 3, wherein said adjusting further comprises:
in a case that the load level is higher than a first threshold and free resources are available in the cellular radio system, allocating more resources to the D2D communications based on the load level; and
in a case that the load level is lower than a second threshold, reclaiming at least part of the resources allocated for the D2D communications based on the load level.

5. The method of claim 1, wherein said at least one access control parameter includes a barring bitmap indicating whether an access class to which a terminal device belongs is barred from the D2D based access.

6. The method of claim 1, wherein transmitting the message comprises broadcasting the message via a system information block message.

7. A method in a terminal device of a cellular radio system, the method comprising:
receiving a message from a base station of the cellular radio system, wherein said message includes at least one access control parameter for a device-to-device, D2D, based access, wherein the at least one access control parameter is used for the D2D based access of a first type;
determining whether the D2D based access is allowed or barred based on the at least one access control parameter; and
initiating the D2D based access in response to determining that the D2D based access is allowed, wherein said initiating the D2D based access comprises:
initiating the D2D based access of the first type in response to determining that the D2D based access of the first type is allowed based on the at least one access control parameter; and
when the D2D based access of the first type is barred based on the at least one access control parameter,
determining whether the D2D based access of a second type is allowed or barred based on at least one access control parameter for the D2D based access of the second type received from the base station; and
initiating the D2D based access of the second type in response to determining that the D2D based access of the second type is allowed.

8. The method of claim 7, wherein said at least one access control parameter includes a barring factor indicating a probability that a D2D based access is allowed and a barring time indicating a time period that the terminal device waits before retrying a D2D based access after being barred.

9. The method of claim 7, wherein said at least one access control parameter includes a barring bitmap indicating whether an access class to which the terminal device belongs is barred from the D2D based access.

10. A base station of a cellular radio system, the base station comprising a processor and a memory, said memory containing instructions executable by said processor, whereby said base station is operative to:
obtain at least one access control parameter for a device-to-device, D2D, based access, wherein said at least one access control parameter is used for a D2D contention based access or for a D2D contention free access, and wherein said at least one access control parameter includes a barring factor indicating a probability that a D2D based access is allowed and a barring time indicating a time period that a terminal device waits before retrying a D2D based access after being barred; and
transmit a message including said at least one access control parameter to one or more terminal devices.

11. The base station of claim 10, wherein said memory containing instructions executable by said processor, whereby said base station is operative to:
monitor a load level of resources allocated for D2D communications; and
determine said at least one access control parameter based at least partly on the load level.

12. The base station of claim 11, wherein said memory containing instructions executable by said processor, whereby said base station is further operative to:
adjust the resources allocated for the D2D communications based on the load level; and
monitor the load level of the adjusted resources allocated for the D2D communications.

13. The base station of claim 12, wherein said memory containing instructions executable by said processor, whereby said base station is further operative to:
in a case that the load level is higher than a first threshold and free resources are available in the cellular radio system, allocate more resources to the D2D communications based on the load level; and
in a case that the load level is lower than a second threshold, reclaim at least part of the resources allocated for the D2D communications based on the load level.

14. The base station of claim 10, wherein said at least one access control parameter includes a barring bitmap indicating whether an access class to which a terminal device belongs is barred from a D2D based access.

15. A terminal device of a cellular radio system, wherein the terminal device comprises a processor and memory, said memory containing instructions executable by said processor, whereby said terminal device is operative to:
- receive a message from a base station of the cellular radio system, wherein said message includes at least one access control parameter for a device-to-device, D2D, based access, wherein the at least one access control parameter is used for a D2D based access of a first type or for a D2D based access of a second type, and wherein the D2D based access of the first type is one of a D2D contention based access and a D2D contention free access, and the D2D based access of the second type is the other of the D2D contention based access and the D2D contention free access;
- determine whether the D2D based access is allowed or barred based on the at least one access control parameter; and
- initiate the D2D based access in response to determining that the D2D based access is allowed.

16. The terminal device of claim 15, wherein:
the at least one access control parameter is used for the D2D based access of the first type, and
said memory containing instructions executable by said processor, whereby said terminal device is operative to:
- initiate the D2D based access of the first type in response to determining that the D2D based access of the first type is allowed based on the at least one access control parameter; and
- initiate the D2D based access of the second type in response to determining that the D2D based access of the first type is barred based on the at least one access control parameter.

17. The terminal device of claim 16, wherein said memory containing instructions executable by said processor, whereby said terminal device is operative to:
- determine whether the D2D based access of the second type is allowed or barred based on at least one access control parameter for the D2D based access of the second type received from the base station; and
- initiate the D2D based access of the second type if it is determined that the D2D based access of the second type is allowed.

18. The terminal device of claim 15, wherein said at least one access control parameter includes a barring factor indicating a probability that a D2D based access is allowed and a barring time indicating a time period that the terminal device waits before retrying a D2D based access after being barred.

19. The terminal device of claim 15, wherein said at least one access control parameter includes a barring bitmap indicating whether an access class to which the terminal device belongs is barred from the D2D based access.

* * * * *